Patented Sept. 12, 1922.

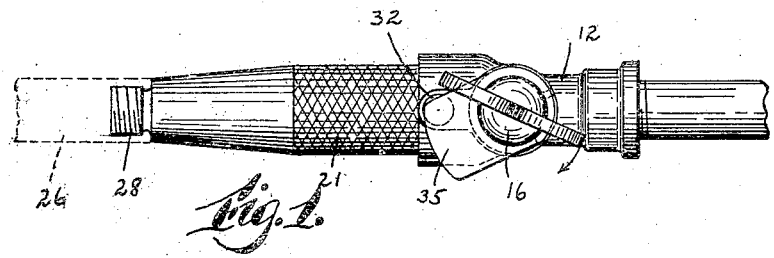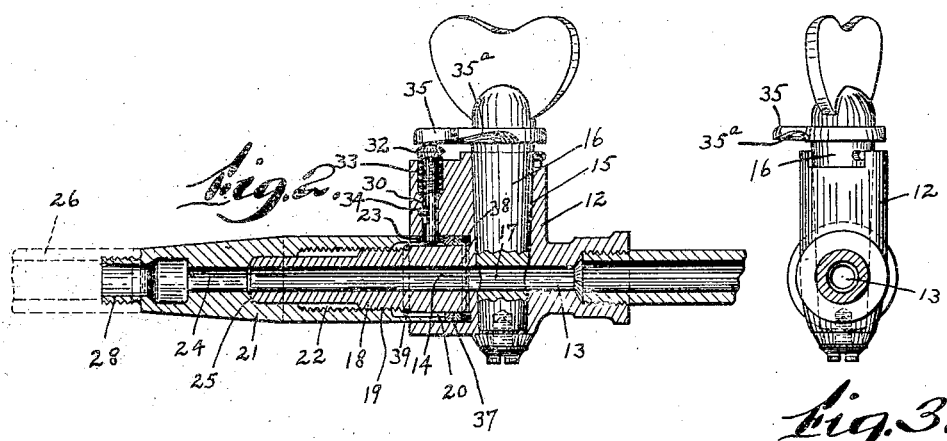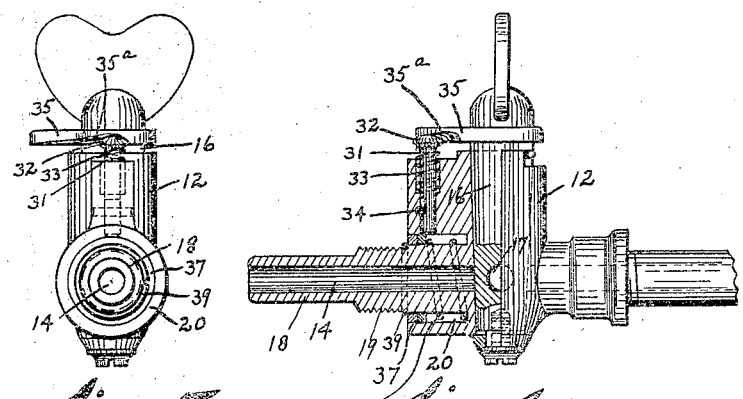

1,428,933

UNITED STATES PATENT OFFICE.

JOHN E. BEAN, JR., OF MERRIMAC, MASSACHUSETTS.

GAS COCK.

Application filed February 16, 1921. Serial No. 445,387.

*To all whom it may concern:*

Be it known that I, JOHN E. BEAN, Jr., a citizen of the United States, residing at Merrimac, in the county of Essex and State of Massachusetts, have invented new and useful Improvements in Gas Cocks, of which the following is a specification.

This invention relates to a gas cock which controls a gas-delivering conduit, usually flexible, detachably connected at one end with the outlet of the cock, and adapted to supply gas to a burner.

The object of the invention is to provide safety means preventing the possibility of the accidental or unintentional escape of gas from the cock when the delivering conduit is detached from the cock.

The invention is embodied in the improvements which I will now proceed to describe and claim.

Of the accompanying drawings forming a part of this specification,—

Figure 1 is a top plan view of a gas cock and a sleeve in which the invention is embodied.

Figure 2 is a longitudinal section of the same, parts being shown in elevation, the cock valve being open.

Figure 3 is an end view, looking from the right in Figure 2, the valve being open.

Figure 4 shows the cock partly in section and partly in elevation, the sleeve being removed and the valve locked in its closed position.

Figure 5 is an end view, looking from the left in Figure 4.

The same reference characters indicate the same parts in all of the figures.

In the drawings, 12 represents the body of a gas cock having an inlet gas duct portion 13, an outlet gas duct portion 14, and a tapered socket 15 in which the usual plug valve 16 is adapted to turn and thus open and close the cock, the valve having the usual gas duct 17. Formed on the body 12 is a projecting nipple 18, externally threaded at 19, and constituting an extension of the duct portion 14.

The body is provided with an annular groove 20, surrounding the inner portion of the nipple. 21 is a sleeve internally threaded at 22, and adapted to be screwed upon the nipple 18, the inner end portion of the sleeve being formed to enter the groove 20, and provided with an orifice 23 (Figure 2). The sleeve is provided with a gas duct portion 24, and with an annular seat 25, forming a gas-tight joint with the outer end of the nipple.

The outer end of the sleeve 21 is formed for engagement with a gas-delivering conduit 26, such as a flexible tube, adapted to conduct gas from the cock to a burner, the sleeve constituting a terminal of the gas-delivering conduit, and being suitably secured to the latter, so that when the sleeve is removed from the cock nipple, it remains connected with the conduit 26. As here shown, the outer end of the sleeve is provided with a corrugated or threaded portion or teat 28, which enters one end of the conduit 26, and upon which the latter may be clamped if desired.

I provide safety means whereby the removal of the sleeve 21 from the nipple 18 is prevented when the valve 16 is open, the removal of the sleeve being possible only when the valve is closed, and whereby the opening of the valve is prevented when the sleeve is removed, the opening of the valve being possible only when the sleeve is in place on the nipple.

In the embodiment of the invention here shown, said safety means is organized as next described. Fitted to move endwise in a guide 30 in the body 12 is a double-acting detent 31, formed as a bolt or pin, projecting at its outer end from the body and having a rounded head 32. The detent 31 is movable into the groove 20 and sleeve orifice 23, as shown by Figure 2, is normally held out of the groove 20, with its head 32 at a maximum projection from the body by a spring 33. A stop pin 34 limits the endwise movements of the detent.

Fixed to the valve 16 is an ear 35, which has a cam-shaped or inclined portion 35ª, adapted to act on the detent head 32 and force the detent into the sleeve orifice 23, when the valve is turned to its open position. Fitted to move in the annular groove 30 is an annular detent stop 37, which may be a ring or washer or, as here shown, two rings or washers placed edge to edge. The detent stop 37 is normally held by a spring 38 against a stop shoulder 39 on the nipple 18, the stop 37, when thus normally held, being in position to prevent the entrance of the detent 31 into the groove 20, as shown by Figure 4.

The relative arrangement of the valve ear 35 and valve duct 17, is such that when the valve is opened, the detent 31 is pressed inwardly by the action of the cam portion 35ᵃ of the valve ear on the head of the detent. It will be seen, however, that when the sleeve 21 is removed from the nipple 18, the detent 31 is rigidly supported in its normal or outward position by the annular stop 37, as shown by Figure 4, so that the detent cannot be pressed inward by the cam portion 35ⁿ and forms a rigid stop, engaging the valve arm 35 to prevent the valve from turning to its open position.

It will also be seen that when the sleeve 21 is in place on the nipple and the valve is opened, the sleeve cannot be removed from the nipple, because it is locked by the detent 31, the latter being confined, as shown by Figure 2, by the ear of the valve. It follows, therefore, that removal of the sleeve from the nipple is prevented when the valve is open, and the opening of the valve is prevented when the sleeve is removed, so that there is no possibility of escape of gas into the room when the gas-delivering conduit is separated from the cock.

I claim:

1. In combination, a gas-cock body having a projecting outlet nipple, a sleeve adapted to receive and be detachably secured to the nipple, said sleeve forming a part of a gas-delivering conduit, a plug valve controlling the gas duct through the body, and safety means including elements carried respectively by the valve and by the body, the form and arrangement of said elements being such that removal of the sleeve from the nipple is prevented when the valve is open, and opening of the valve is prevented when the sleeve is removed.

2. In combination, a gas-cock body having a projecting outlet nipple; a sleeve adapted to receive and be detachably secured to said nipple, said sleeve forming a part of a gas-delivering conduit; a plug valve controlling the gas duct through the body; and safety means embodied in an ear projecting laterally from the valve, a spring-pressed detent movable in the body, and a spring-pressed detent stop, also movable in the body, the arrangement being such that removal of the sleeve from the nipple is prevented when the valve is open, and opening of the valve is prevented when the sleeve is removed.

3. In combination, a gas-cock body having a projecting externally threaded outlet nipple, and an annular groove surrounding the inner portion of the nipple; an internally threaded sleeve adapted to be secured upon the nipple, and to enter said groove, the sleeve forming a part of a gas-delivering conduit; a plug valve controlling the gas duct through the body; and safety means embodied in a cam-shaped ear projecting laterally from the valve, a spring-pressed detent movable in the body, and normally projected into the path of said ear, said detent being adapted to enter the annular groove and engage an orifice in the sleeve, and an annular spring-pressed stop movable in said groove and normally in the path of the detent, the arrangement being such that when the sleeve is in place on the nipple, and the valve is open, the sleeve is locked by the cam-shaped valve ear and the detent, and when the valve is closed, the detent assumes its normal position, engages the valve arm to lock the valve in its closed position, and releases the sleeve to permit removal of the latter from the nipple.

In testimony whereof I have affixed my signature.

JOHN E. BEAN, Jʀ.